United States Patent
Smith et al.

(10) Patent No.: US 8,332,281 B2
(45) Date of Patent: Dec. 11, 2012

(54) METHOD OF DISPLAYING, MANAGING AND SELLING IMAGES IN AN EVENT PHOTOGRAPHY ENVIRONMENT

(75) Inventors: Caine Smith, Grand Cayman (KY); Brynley Davies, Grand Cayman (KY)

(73) Assignee: Image Holdings, Grand Cayman (KY)

( * ) Notice: Subject to any disclaimer, the term of this patent is extended or adjusted under 35 U.S.C. 154(b) by 104 days.

(21) Appl. No.: 12/874,772

(22) Filed: Sep. 2, 2010

(65) Prior Publication Data

US 2011/0055045 A1    Mar. 3, 2011

Related U.S. Application Data

(60) Provisional application No. 61/239,398, filed on Sep. 2, 2009.

(51) Int. Cl.
*G06Q 30/00* (2012.01)
(52) U.S. Cl. .................................................... 705/26.5
(58) Field of Classification Search ............... 705/26.1, 705/26.5, 26.61, 27.1, 27.2
See application file for complete search history.

(56) References Cited

U.S. PATENT DOCUMENTS

| | | | |
|---|---|---|---|
| 306,291 | A | 10/1884 | Smyth |
| 2,080,995 | A | 5/1937 | Baker et al. |
| 2,091,867 | A | 8/1937 | Martin |
| 2,375,113 | A | 5/1945 | Klammet et al. |
| 2,443,320 | A | 6/1948 | Meyer et al. |
| D156,256 | S | 11/1949 | Kivett |
| D167,835 | S | 9/1952 | James |
| 2,612,168 | A | 9/1952 | Stark |
| 2,852,407 | A | 9/1958 | Wood, Jr. et al. |
| 2,944,586 | A | 7/1960 | Yanulis |
| 2,994,298 | A | 8/1961 | Thomas |
| 3,265,453 | A | 8/1966 | Seide |
| 3,281,259 | A | 10/1966 | Lux et al. |
| 3,498,865 | A | 3/1970 | Paquin et al. |
| 3,551,199 | A | 12/1970 | Forster |
| 3,570,748 | A | 3/1971 | Coyle et al. |
| 3,641,690 | A | 2/1972 | Ehrensaal |
| 3,858,340 | A | 1/1975 | Melanson |
| 3,911,173 | A | 10/1975 | Sprague, Jr. |
| 3,924,013 | A | 12/1975 | Kane |
| 3,944,453 | A | 3/1976 | Chudgar et al. |
| 4,082,854 | A | 4/1978 | Yamada et al. |
| 4,097,893 | A | 6/1978 | Camras |
| 4,234,624 | A | 11/1980 | Linderoth et al. |

(Continued)

FOREIGN PATENT DOCUMENTS

DE    10017991    1/2001

(Continued)

OTHER PUBLICATIONS

Jan. 2009—http://web.archive.org/web/20081120153811/http://www.disneyphotopass.com/aboutdpp.aspx.*

(Continued)

*Primary Examiner* — Matthew Zimmerman
(74) *Attorney, Agent, or Firm* — Sheridan Ross P.C.

(57) ABSTRACT

An image display system is provided that allows event organizers to sell images of the event to interested parties. The interested parties would have access to the images and allow them to copy and manipulate the same. In addition, customers would have the ability to order image related products containing one or more of the images.

17 Claims, 4 Drawing Sheets

U.S. PATENT DOCUMENTS

| | | | |
|---|---|---|---|
| 4,390,387 A | 6/1983 | Mahn | |
| 4,465,926 A | 8/1984 | Apitz et al. | |
| 4,484,971 A | 11/1984 | Wang | |
| 4,525,414 A | 6/1985 | Ohya et al. | |
| 4,528,219 A | 7/1985 | Yamada et al. | |
| 4,559,095 A | 12/1985 | Babbin | |
| 4,580,685 A | 4/1986 | Jorquez | |
| 4,636,609 A | 1/1987 | Nakamata | |
| 4,644,127 A | 2/1987 | La Rocca | |
| 4,791,598 A | 12/1988 | Liou et al. | |
| 4,805,037 A | 2/1989 | Noble et al. | |
| 4,861,404 A | 8/1989 | Neff | |
| 4,902,378 A | 2/1990 | Ouderkirk et al. | |
| 4,916,532 A | 4/1990 | Streck et al. | |
| 4,931,125 A | 6/1990 | Volkmann et al. | |
| 4,936,938 A | 6/1990 | Simpson et al. | |
| 4,941,193 A | 7/1990 | Barnsley et al. | |
| 4,954,393 A | 9/1990 | Jones | |
| 4,979,133 A | 12/1990 | Arima et al. | |
| 4,991,205 A | 2/1991 | Lemelson | |
| 5,056,034 A | 10/1991 | Rucki et al. | |
| 5,096,366 A | 3/1992 | Bernard et al. | |
| 5,101,972 A | 4/1992 | Hunt et al. | |
| 5,132,922 A | 7/1992 | Khan et al. | |
| D328,674 S | 8/1992 | Dokoupil et al. | |
| 5,136,646 A | 8/1992 | Haber et al. | |
| 5,164,992 A | 11/1992 | Turk et al. | |
| 5,176,264 A | 1/1993 | De Palma | |
| 5,189,130 A | 2/1993 | Kageyama | |
| 5,213,900 A | 5/1993 | Friedrich | |
| 5,321,396 A | 6/1994 | Lamming et al. | |
| 5,326,173 A | 7/1994 | Evans et al. | |
| 5,341,943 A | 8/1994 | Fraser | |
| 5,348,604 A | 9/1994 | Neff | |
| D351,513 S | 10/1994 | Kreppein | |
| 5,363,504 A | 11/1994 | Hasuo | |
| 5,381,155 A | 1/1995 | Gerber | |
| D357,311 S | 4/1995 | Yehl | |
| 5,408,080 A | 4/1995 | Zazzu et al. | |
| 5,432,864 A | 7/1995 | Lu et al. | |
| D360,799 S | 8/1995 | Rocco et al. | |
| 5,493,677 A | 2/1996 | Balogh et al. | |
| 5,542,550 A | 8/1996 | Kakavoulis-Perera et al. | |
| 5,549,943 A | 8/1996 | Vicik | |
| 5,550,746 A * | 8/1996 | Jacobs | 700/231 |
| 5,550,928 A | 8/1996 | Lu et al. | |
| 5,553,720 A | 9/1996 | Dardashti | |
| 5,554,984 A | 9/1996 | Shigenaga et al. | |
| 5,560,499 A | 10/1996 | Dardashti | |
| 5,566,327 A | 10/1996 | Sehr | |
| 5,572,596 A | 11/1996 | Wildes et al. | |
| 5,576,838 A | 11/1996 | Renie | |
| 5,598,208 A | 1/1997 | McClintock | |
| 5,602,375 A | 2/1997 | Sunahara et al. | |
| 5,618,101 A | 4/1997 | Yeh | |
| 5,629,981 A | 5/1997 | Nerlikar | |
| 5,655,053 A | 8/1997 | Renie | |
| 5,666,215 A | 9/1997 | Fredlund et al. | |
| 5,680,223 A | 10/1997 | Cooper et al. | |
| 5,699,449 A | 12/1997 | Javidi | |
| 5,796,428 A | 8/1998 | Matsumoto et al. | |
| 5,802,208 A | 9/1998 | Podilchuk et al. | |
| 5,840,147 A | 11/1998 | Grimm | |
| 5,947,369 A | 9/1999 | Frommer et al. | |
| 6,031,963 A | 2/2000 | Kitamura et al. | |
| 6,108,437 A | 8/2000 | Lin | |
| D430,443 S | 9/2000 | Dardashti | |
| D435,929 S | 1/2001 | Yeh | |
| 6,217,695 B1 | 4/2001 | Goldberg et al. | |
| 6,238,022 B1 | 5/2001 | Chan | |
| 6,260,296 B1 | 7/2001 | Carney | |
| D448,234 S | 9/2001 | Lopez | |
| 6,335,742 B1 | 1/2002 | Takemoto | |
| 6,389,181 B2 | 5/2002 | Shaffer et al. | |
| 6,427,849 B2 | 8/2002 | Swan | |
| 6,430,307 B1 | 8/2002 | Souma et al. | |
| 6,446,376 B1 | 9/2002 | Chan | |
| 6,499,892 B2 | 12/2002 | Beggiao | |
| 6,526,158 B1 * | 2/2003 | Goldberg | 382/115 |
| 6,547,456 B2 | 4/2003 | Wechsler et al. | |
| 6,608,563 B2 | 8/2003 | Weston et al. | |
| 6,646,754 B1 * | 11/2003 | Redd et al. | 358/1.13 |
| 6,747,690 B2 | 6/2004 | Molgaard | |
| 6,801,641 B2 | 10/2004 | Eraslan | |
| 6,845,913 B2 | 1/2005 | Madding et al. | |
| 6,914,626 B2 | 7/2005 | Squibbs | |
| 6,928,230 B2 | 8/2005 | Squibbs | |
| 6,985,875 B1 | 1/2006 | Wolf | |
| 7,016,059 B1 * | 3/2006 | Baum et al. | 358/1.15 |
| 7,016,532 B2 | 3/2006 | Boncyk et al. | |
| 7,047,214 B2 | 5/2006 | Wolf | |
| 7,068,309 B2 | 6/2006 | Toyama et al. | |
| 7,083,052 B1 | 8/2006 | Morle | |
| 7,093,762 B2 | 8/2006 | Silverbrook et al. | |
| 7,130,454 B1 | 10/2006 | Berube et al. | |
| 7,133,740 B1 | 11/2006 | Stenson et al. | |
| 7,340,214 B1 | 3/2008 | Hamberg | |
| 7,343,320 B1 * | 3/2008 | Treyz et al. | 705/26.5 |
| 7,372,482 B2 | 5/2008 | Smith | |
| 7,430,003 B2 | 9/2008 | Nichols et al. | |
| 7,472,134 B2 | 12/2008 | Kaku | |
| 7,542,605 B2 | 6/2009 | Yoshida | |
| 7,557,937 B2 | 7/2009 | Song | |
| 7,561,723 B2 | 7/2009 | Goldberg et al. | |
| 7,685,428 B2 | 3/2010 | Piersol | |
| 7,738,741 B2 | 6/2010 | Pfleging et al. | |
| 2001/0049640 A1 * | 12/2001 | Kurokawa et al. | 705/26 |
| 2002/0010638 A1 * | 1/2002 | Fischer | 705/26 |
| 2002/0101519 A1 | 8/2002 | Myers | |
| 2003/0065590 A1 * | 4/2003 | Haeberli | 705/27 |
| 2003/0086123 A1 | 5/2003 | Torrens-Burton | |
| 2003/0118216 A1 | 6/2003 | Goldberg | |
| 2004/0008872 A1 | 1/2004 | Goldberg | |
| 2004/0075752 A1 | 4/2004 | Valleriano et al. | |
| 2004/0119831 A1 | 6/2004 | Miyawaki | |
| 2004/0135902 A1 | 7/2004 | Steensma | |
| 2004/0156535 A1 | 8/2004 | Goldberg et al. | |
| 2004/0181671 A1 | 9/2004 | Brundage et al. | |
| 2004/0216039 A1 | 10/2004 | Lane et al. | |
| 2004/0260625 A1 * | 12/2004 | Usami et al. | 705/26 |
| 2005/0047777 A1 | 3/2005 | Molldrem, Jr. | |
| 2005/0093999 A1 | 5/2005 | Yamaya | |
| 2005/0100195 A1 | 5/2005 | Li | |
| 2005/0188051 A1 * | 8/2005 | Sneh | 709/213 |
| 2006/0085477 A1 | 4/2006 | Phillips et al. | |
| 2006/0125930 A1 | 6/2006 | Mindrum et al. | |
| 2006/0203312 A1 | 9/2006 | Van De Sluis et al. | |
| 2006/0265508 A1 | 11/2006 | Angel et al. | |
| 2008/0310688 A1 | 12/2008 | Goldberg | |
| 2011/0066494 A1 | 3/2011 | Smith et al. | |

FOREIGN PATENT DOCUMENTS

| | | |
|---|---|---|
| EP | 0644032 | 3/1995 |
| EP | 0856972 | 8/1998 |
| EP | 1288798 | 3/2003 |
| WO | WO 95/24795 | 9/1995 |
| WO | WO 97/42793 | 11/1997 |
| WO | WO 97/48017 | 12/1997 |
| WO | WO 98/10358 | 3/1998 |
| WO | WO 02/19137 | 3/2002 |
| WO | WO 02/25926 | 3/2002 |
| WO | WO 2004/072897 | 8/2004 |

OTHER PUBLICATIONS

Official Action for U.S. Appl. No. 12/883,947, mailed Dec. 27, 2011 13 pages.

Disney's PhotoPass, www.disneyphotopass.com/, printed Dec. 15, 2010, 2 pages.

U.S. Appl. No. 12/442,361, filed Mar. 20, 2009, Goldberg.

Das et al., "Automatic face-based image grouping for albuming", Systems, Man and Cybernetics, 2003. IEEE International Conference on; vol. 4, Oct. 5, 2003, pp. 3726-3731.

Longbin Chen et al., "Face annotation for family photo management", International Journal of Image and Graphics, World Scientific Publishing Co., Singapore, SG, vol. 3, No. 1, Dec. 30, 2002, pp. 81-94.

Lei Zhang et al., "Automated annotation of human faces in family albums", Proceedings of the 11th ACM International Conference on Multimedia, Berkley, CA, Nov. 4-6, 2003, vol. CONF. 11, Nov. 2, 2003, pp. 355-358.
Loui et al., "Automated event clustering and quality screening of consumer pictures for digital albuming", IEEE Transactions on Multimedia, IEEE Service Center, Piscataway, NJ, US, vol. 5, No. 3, Sep. 1, 2003, pp. 390-402.
Kuchinsky et al., "FotoFile: A Consumer Multimedia Organization and Retrieval System," Proceedings of the SOGCHI conference on Human factors in computing systems: the CHI is the limit, p. 496-503, May 15-20, 1999, Pittsburgh, Pennsylvania, United States.
International Search Report for International (PCT) Patent Application No. PCT/IB10/02558, mailed Jan. 19, 2011.
Written Opinion for International (PCT) Patent Application No. PCT/IB10/02558, mailed Jan. 19, 2011.
International Search Report for International (PCT) Patent Application No. PCT/IB10/02427, mailed Feb. 17, 2011.
Written Opinion for International (PCT) Patent Application No. PCT/IB10/02427, mailed Feb. 17, 2011.
International Preliminary Report on Patentability for International (PCT) Patent Application No. PCT/IB2010/002558, mailed Mar. 15, 2012 6 pages.
International Preliminary Report on Patentability for International (PCT) Patent Application No. PCT/IB2010/002427, mailed Mar. 29, 2012 7 pages.
Official Action for U.S. Appl. No. 12/883,947, mailed May 22, 2012 15 pages.
Notice of Allowance for U.S. Appl. No. 12/883,947, mailed Oct. 12, 2012 8 pages.

* cited by examiner

METHOD OF DISPLAYING, MANAGING AND SELLING IMAGES IN AN EVENT PHOTOGRAPHY ENVIRONMENT

CROSS-REFERENCE TO RELATED APPLICATION

This application claims the benefit of U.S. Provisional Patent Application Ser. No. 61/239,398, filed Sep. 2, 2009, the entire disclosure of which is incorporated by reference in its entirety herein.

FIELD OF THE INVENTION

Embodiments of the present invention are generally related to a system that allows customers to purchase event photos and/or videos (images) and that facilitates customer interaction with the purchased images via the Internet. Other embodiments of the present invention are generally related to a system that provides customer or potential customer access to images via a wireless communication device.

BACKGROUND OF THE INVENTION

Individuals attending an event or on a vacation often wish to obtain professional images of the event or special activities. As used herein, the term "event" may mean a single activity or multiple activities over the course of one or more days and the term "sub-event" means a single activity that is part of an event. For example, a cruise would be an event and boarding photos or photos from a specific party on a cruise would be a sub-event. Often, event holders employ professional photographers and/or videographers that offer to sell photos of the attendees during the event or afterwards. The event holder will often display the event images in a centralized location with the hope that one or more attendees will choose and purchase one or more images. The selected images are then provided to the customer at the event or at a later time. The unselected images are discarded which, if printed for purposes of customer review, is wasteful and environmentally unsound. Alternatively, the event holder will allow the potential customer to review images on a viewing system provided by the event holder or the photographer/videographer which requires the potential customer to select and purchase desired images at the event, or view low resolution or water marked versions of images via a website on the attendees' own computer at a later time. This method of operation—taking a photo, editing and printing the photo, displaying the photo in a gallery and hopefully selling that photo has been employed for the past 20-30 years. One of skill in the art will appreciate that this method of selling photographs has the drawback of an increased time burden related to editing photos that may never be purchased. It would also be desirable to avoid the costs for printing, materials, labor etc., associated with preparing photos that may never be sold.

Another known method involves selling the rights to images prior to an event or to offer photos electronically for purchase during or post event. Instead of the event holder or photographer maintaining exclusive possession and control over the electronic versions of the images, the images are stored on a portable storage media like a CD, DVD, memory card or thumb drive and are provided at a cost to the customer. The system allows the customer to use, copy and modify the purchased images. The drawback of this method is minimal interaction between the event holder and/or photographer and the customer. Thus, opportunities to sell related collateral items, such as calendars, coffee mugs, tee shirts, etc. that incorporate the images, are reduced or lost to the event holder or photographer.

Thus there is a long felt need to provide a system for facilitating the transfer of images to customers or potential customers without having to generate physical images for review. The following disclosure describes the system that allows customers and potential customers to obtain, modify and purchase image-related items in a cost effective and expedient way.

SUMMARY OF THE INVENTION

It is one aspect of the present invention to provide a photo delivery system that allows customers and potential customers to receive, interact and purchase photos related to an event. As used herein, "event" shall refer to a charity event, a sporting event, a social event, a business event, a vacation event, etc. For example, cruise lines often utilize photographers to capture photos of passengers at embarkation or at a party on a cruise ship. Theme parks similarly provide photographers associated with specific rides or attractions or are located throughout the park to take photographs of individuals, families or groups of people. One embodiment of the present invention is a computer software program, which may be accessed via the Internet, that employs a rich Internet application, such as Adobe® Flash, Adobe AIR, Java®, and other similar applications known to those in the art to simplify image design that enables enhanced image review and editing. In operation, images associated with an event are taken by a photographer or videographer employed by an event holder, cruise line, vacation director, theme park or resort photographer, etc. (hereinafter "event holder") and sold to an attendee/customer on a CD, DVD, Flash drive, thumb drive, via email, via the Internet, or other similar media (hereinafter "electronic media"). The customer accesses the images by installing a computer application either embedded in the electronic media received from the event holder or otherwise obtained by the customer, for example, via the Internet, an email, or an application installed on a wireless communication device. The application allows the individual to access the purchased images in a native format, save a copy of the images, and manipulate the images as desired using a computer, including a desktop, laptop, notebook, smart phone, iPad®, Kindle®, or similar wireless device. The application would also allow customers to order professional printing services, image enhancement or collateral items incorporating one or more of the images through a designated website hosted by the event holder or authorized third party. Collateral items include mugs, key chains, t-shirts, etc. With respect to image enhancement, some embodiments contemplate facilitating interaction between the customer and event holder, or image expert employed thereby, wherein the customer may have the ability to request specific editing be performed on a particular image they have purchased. This interaction allows the image to be cropped, color enhanced, or any other available image altering techniques by a third-party professional, thereby relieving the event holder from the task of editing a photo in a way that may not be acceptable or desired by the customer. As image editing and printing are no longer required, time and costs are reduced.

It is another aspect of the present invention to provide an application that can be used in an online or offline mode. The online mode will allow users to connect to the Internet and increase functionality and features provided by the application that are associated solely with the website. Working online also allows the user to receive automatic upgrades to the application or at least be offered the opportunity to receive an upgrade. In the offline mode, core functions of the application would be available, such as the ability to manipulate and create new images and image products. Once the application is connected to the Internet, any edited photos and requests for image products may be synched to the event server for fulfillment. As used herein, "event server" means the database containing event images and interactive application software hosted by the event holder or an authorized third party. It is also contemplated that a customer's altered images may be synched or otherwise uploaded to an event server to be viewed by other interested parties or individuals, such as relatives, friends or acquaintances met at the event, who would have the ability to access and purchase the edited or unedited images. Similarly, the user may be able to upload to the server images taken by the user at the event.

The method and system of the present invention works with customers who have purchased rights to view, export and/or manipulate images prior to, during or following an event. For those customers who did not purchase rights prior to or during the event, they can still access and acquire images after the event. In one embodiment, attendees of the event are provided images on electronic media, even if they have not purchased rights to the images. However, access to the images on the electronic media is restricted or blocked. The attendee can gain access to the blocked images by being provided an appropriate access code that is only provided to the attendee after the attendee purchases rights to the images. Alternatively, the attendee may access an authorized website, download the necessary software application and provide contact and billing information in the same way as other customers did before and during the event. With the contact and billing information entered and saved to the event server, the attendee is given access to the images. As yet another alternative, the attendee may be given access to low resolution images or images with an obscuring watermark until such time as the attendee purchases rights to the images in their native, or in some users edited, format.

In one embodiment of the present invention, a mobile application is provided for installation onto a mobile communication device such as a Droid® phone, iPhone®, Blackberry®, smart phone or personal digital assistant (PDA). The mobile application device will allow users to access the system prior to, during or after an event in the same manner as accomplished on a home computer. As such, event specific details would be associated with the user's mobile device. In another embodiment of the present invention involving mobile or wireless devices, the user would then have the ability to notify the event organizer via the mobile device that a particular image or images were desired for purchase. An application resident on the mobile device could transmit a signal to the event server which would contain data identifying the customer and the image. Because the application is loaded on the mobile device, sufficient information has been gathered by the application or entered by the user identifying the user (name, mobile phone number), delivery details, and payment information. Features of the software application resident on the mobile device would also allow the individual to select or designate photos as they are being taken. For example, using the application, a signal is sent by the user's mobile device to a designated recipient. The signal includes a user identification and a time stamp or image specific identifying information, such as a location using global positioning technology. The camera equipment taking the images may be tied into the event server. As used herein, the term "event server" comprises the hardware and operational software that stores images and customer information, provides access to images and permits copying and manipulation of images. The event server may be located at the event, such as on a cruise ship or at a particular resort or theme park, and following the event the images and other event-specific information may be transferred to a different event server located at a different location such as a centralized server hosting information from multiple events. In this way, the particular image will be located by matching the user and other identification information. The images will be sent to the user for review and possible purchase. Alternatively, a user specific or image specific code may be sent to the server by the user's wireless device when prompted by the user. For example, sending a text message to a specific number associated with a specific photographer or videographer coupled with a time stamp would allow the event holder to forward the designated image directly to the user in real time or at a later time. Alternatively, an individual may pre-purchase rights to all photos of the event. Images of the individual's photos would be directly sent to their individual account, to their email or some other account associated with and accessible by the user.

It is thus one aspect of the present invention to provide a method of providing digital images to a customer comprising: taking a plurality of images of a customer at an event; forwarding digital versions of the images to the customer; providing a software application to the customer; allowing the software application to establish a connection to an event server that allows the customer to view the images and to purchase image related items; and allowing the user to copy and manipulate purchased images.

It is another aspect of the present invention to provide a method of providing digital images to an individual comprising: obtaining an image of the individual; receiving a signal indicating that the individual wishes to obtain the image; matching the individual with the image; and delivering the image to the individual. In one embodiment, the individual may be notified by a text message with instructions to access an image viewing application, an email message with instructions to access an image viewing application, an email message sent to customers who already have access to an appropriate image viewing application where the message is sent using the application or by using a conventional email account, a text message with a link to the image, an email message with a link to the image, a text message with a link to a website for accessing the image, an email message with a link to a website for accessing to the image, a phone call, a voice mail, a UPC code, or a QR code or by other notification methods known to persons of skill in the art.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

Figure 1:
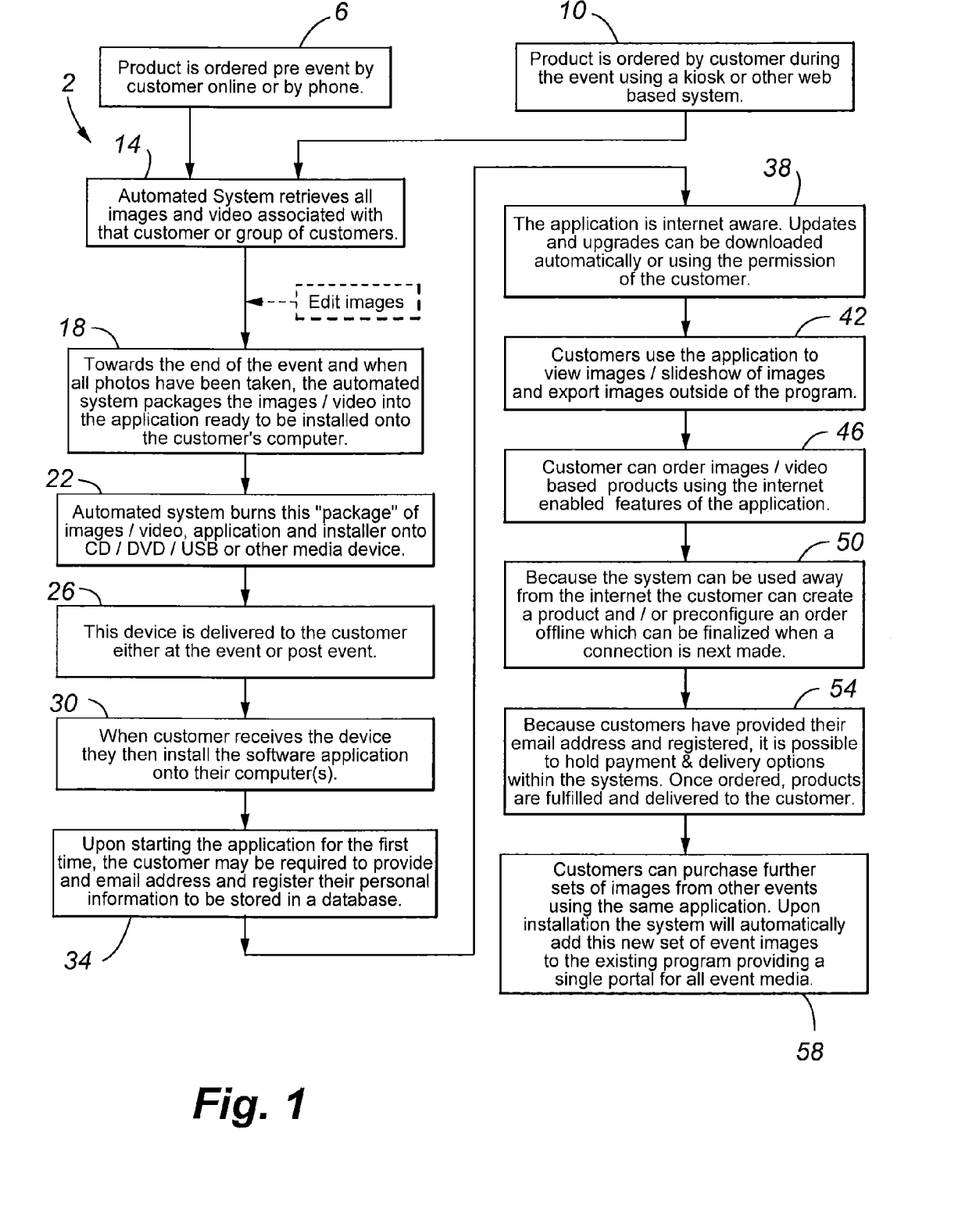
FIG. 1 is a process flow of one embodiment of the present invention.

FIG. 1 shows a workflow associated with a digital image system 2 of one embodiment of the present invention. Here, images are ordered by the customer pre-event 6, either on-line, by phone, by mail or by other means. It is contemplated that the customer would be aware of the ability to pre-purchase images by word of mouth, product marketing or having previously experienced a particular event. For example, a cruise line often sells photo packages before the cruise begins. Alternatively, a kiosk, other web-based systems or paper order forms may be provided by the event operator that allows ordering by the customer during the event 10. The individual may also be notified of the ability to purchase event images via an email, social media websites, invitation websites, or other similar means.

A photographer and/or videographer captures and saves images at the event. At or near the end of the event, an automated system retrieves all images associated with a customer or group of customers 14. For example, it is well known in the art to use identification cards employing magnetic strips, bar codes and RFID technology to facilitate linking of individual to image. In addition, facial or pattern recognition, or other known methods may be used to index and group images.

Towards the end of the event, all of the images are taken and uploaded into the digital photo system 2 for separation into a logical grouping. Such grouping may be customer specific, by cabin or room number, by an assigned or associated code, by individual identification, by family identification, etc. In one embodiment, the digital photo system includes a memory or database for storing images, software applications and a processor for logically grouping images and one or more user interfaces. The digital photo system 2 then packages the images together with a software application and/or installer program for delivery to the customer 18. The images are delivered to the customer 22 via a solid state delivery means, such as CD, DVD, flash memory drive, memory card 26 or other electronic media. The images may also be delivered via a web-based download. Those of skill in the art will appreciate that the digital photo system 2 may also maintain the images in a form accessible via the Internet by a customer upon entering a particular code or codes. In this instance, the customer would be notified that his or her images were ready via an email, text, Twitter©, or similar notification or the customer would log on to an Internet site at a later time to access to the digital photo system to obtain their images.

In one embodiment of the present invention, the customer would install the software application received from the event host onto a computer 30 to permit viewing, editing and manipulation of the images. Other embodiments of the present invention allow the user to obtain the application from one or more authorized websites on the Internet or by other means. Still other embodiments omit the need for application installation on a home computer. More specifically, an Internet-based system may be provided that accesses the electronic media automatically, or when prompted by the event server. Once accessed, the customer would be able to copy and manipulate the images. The Internet-based system may possess the same functionality as an installed application or may redirect customers to other websites and/or applications that would provide desired functionality. In a related embodiment, a potential customer is given the electronic media that is accessed via an Internet-based application that provides limited access to the images stored on the electronic media (see the description of FIG. 2 below for a discussion of methods of providing pictures to potential customers).

When the application starts for the first time 34, the customer may be required to provide an email address and other information to be used by the application. Other information may include additional identification information as well as delivery and billing information. In one embodiment, the application is Internet aware. When the application is accessed, a connection is automatically made to the Internet to facilitate acquisition and downloading of software updates or upgrades 38. Such upgrades and updates may be downloaded automatically or upon permission of the customer.

In operation, the customers would use the application to view their images individually, via a slide show or any other means currently known 42. As the customer has purchased the images, they may be exported outside the application to the customer's computer, thereby allowing the images to be transferred to other media and computers, via social networking sites, email, etc. In one embodiment, the application links with a social networking site so that the customer does not need to export or otherwise transfer the images to the social networking site. The customer would also be given the ability to order images, videos and related products 46. Related products include, for example, calendars, mugs, clothing, photo books and other items incorporating images. Alternatively, the application may allow for only a limited number of copies to be made of the images, similar to the system employed by Apple's iTunes® music software. Thereafter, additional licenses must be obtained.

In one embodiment, the application will allow for the customer to preview image-based items prior to ordering. In addition, one embodiment of the present invention allows a customer to notify other potentially interested parties that the digital photo system 2 includes images that they may wish to obtain. Once invited, interested parties may access and purchase images or image-based products through a downloaded copy of the application or through a web browser and Internet connection. Those individuals, such as friends, relatives and acquaintances, may also, upon downloading the software, have the ability to interact with the images, download the images, and perhaps upload different images, which enhances the sharing process.

The application may also allow for the customer to customize and order image-based products. For example, calendars, coffee mugs, post cards, business cards, paper weights, tee shirts, puzzles, etc. that incorporate an individual image or images. This may be done on-line via the application software, it may be done through a link or other interconnection to a web-based catalog system, or the application may be used in an offline configuration 50. This may be desirable to those who wish to preconfigure an order or create one or more related products offline at their convenience. The order would be automatically finalized when the application is next connected to the Internet or the application would cause the user to be automatically asked or prompted to finalize and submit the order.

Because one or more of customer email addresses, payment information and delivery instructions may be stored in the system, such as at the time of initial registration, product orders may be promptly fulfilled 54. Customers may also access, edit and update their account information. In addition, the software application will allow customers to access and acquire images from other events hosted by the same or related event hosts using the same software. Similarly, images from other events may automatically be sent to an existing customer's account 58.

The event host or operator may also sell advertising and include it in the software application. The advertising may be available as a link to special offers or discounted pricing if the user agrees to view the advertising. It is a potential revenue source for the event host or operator.

Figure 2:
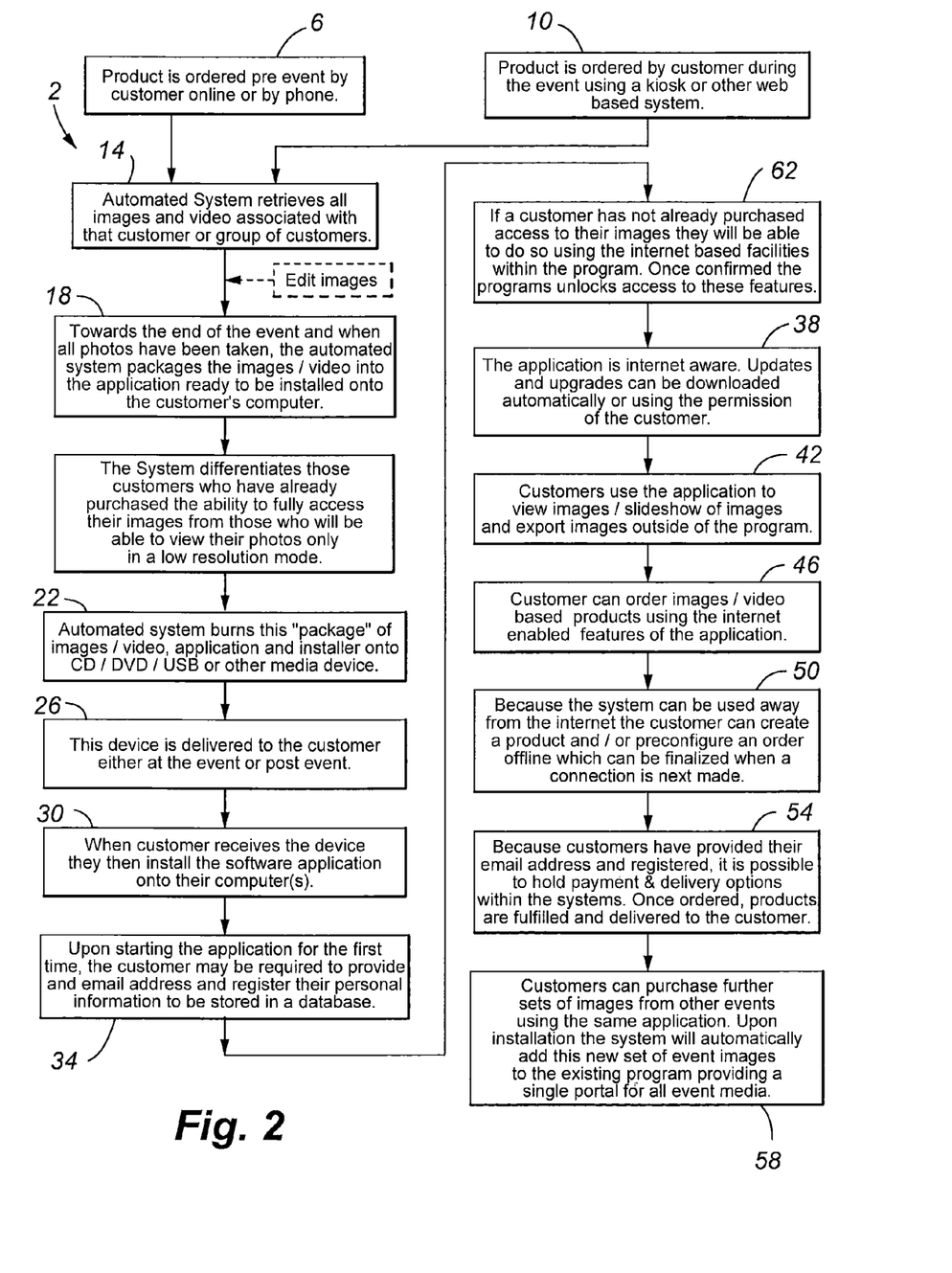
FIG. 2 is a process flow of another embodiment of the present invention.

FIG. 2 shows a work-flow associated with providing a set of images to a plurality of customers, some of whom have purchased the rights to view, export and use the images, and some who have not. For those who have purchased the rights, the work-flow operates as shown in FIG. 1.

For those who have not purchased rights to the images, the ability to purchase the images post-event is shown. Similar to the embodiment of FIG. 1, the digital photo system 2 provides images or electronic media, or otherwise makes the images available to all participants of the event 26. The potential customer would then install the application onto their home computer, iPad®, iPhone®, lap top, computer or any similar computer or smart phone 30. Customers who have already purchased access to their images, would be able to do so using Internet-based facilities within the application. Those individuals who have not purchased images pre-event would be able to do so using Internet-based facilities in combination using the application 62 after an unlock code was entered. The unlock code is provided following completion of customer registration. Alternatively, if the potential customer would prefer to review the images before registering, the images may be altered to allow for a preview for a given amount of time and/or in a lower-resolution format. The altered images may also include a watermark or other means that would render copying undesirable or impossible. Once the potential customer paid for the rights to the images, high quality images would be provided by the application, sent as an email attachment or accessible via an Internet connection, to be copied and manipulated as described above in connection with the embodiment of FIG. 1.

Figure 3:
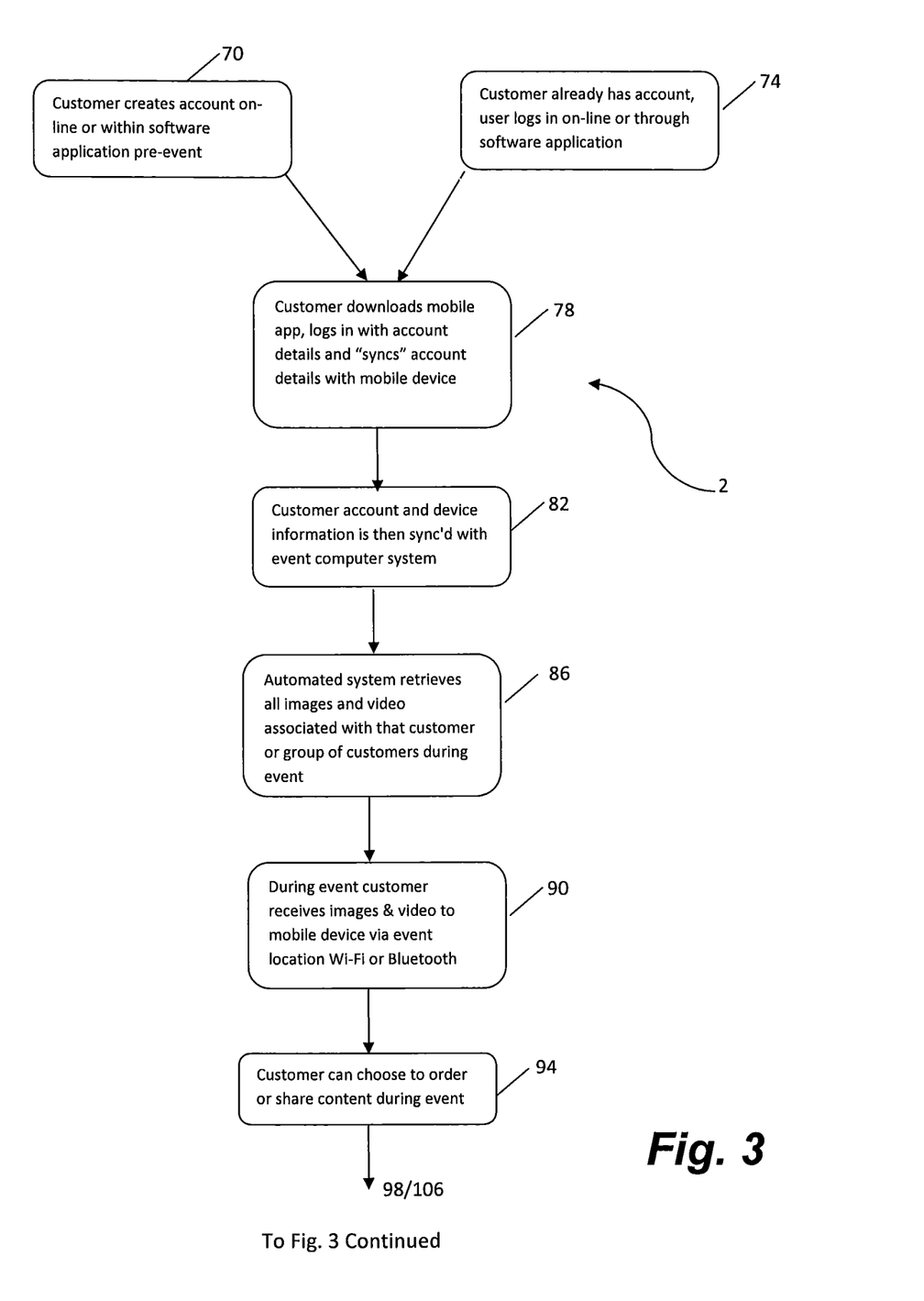
FIG. 3 is a process flow of yet another embodiment of the present invention.

With respect to FIG. 3, still yet another embodiment of the present invention is shown that would be used by a customer via a computer, smart phone, iPad®, or other mobile cellular or web-enabled communication device, to store, view, display, manage and purchase images. This embodiment takes into account the connectivity of the device either via cellular, Wi-Fi or other wireless network technology and allows the customer to receive their images in almost real time and share their images with others during or after the event.

Prior to or during the event, a customer creates an account online 70 or accesses their existing account 74. The customer may download the necessary software to his/her mobile device or smart phone, such as a Blackberry®, iPhone® (hereinafter "mobile device"). Applications may be downloaded to more than one device. For example, this may be a mobile device and a laptop computer or it may be two different mobile devices controlled by two different people in a common group such as two parents, two siblings or two friends. The mobile application allows for a customer to log onto their account and sync with personal and event-specific information 78 obtained from the digital photo system 2. The connection between the event server and the mobile device would identify the mobile device and allow for synchronizing 82 of information between the mobile device and the event servers. Such information would include event details, customer pre-purchases and other personal information. The mobile device will receive instructions and settings on how to access the event servers if needed.

At the event, the automated system collects and retrieves all images associated with each customer or group of customers 86. Also at the event the customer would connect their mobile device to the relevant network that an event operator is using. The mobile device uses the information provided by the operators' event servers to connect to and identify itself to the digital photo system. The event servers may also provide helpful information to the mobile device user such as the location of the photographer/videographer, wait times for access or guidance for obtaining quality images. In this embodiment, however, the receipt of images to an individual's wireless device is generally real-time 90. The images are delivered by any capable wireless communication mode. Alternatively, the images may be sent as an email attachment to an email account associated with the mobile device or other identified devices such as laptops or home computers. Images also may be delivered to the mobile device at a short time later or upon accessing a web-site via the mobile device or home computer, for example. The customer would thus have the option of purchasing individual images or other products from the mobile device anytime during or after an event. The customers can also choose to share their event images with others who are attending the event or have been given access online 94. Those sharing with the customer may or may not be given full access to the images or they may be restricted to viewing lower resolution images. The customer would have the option of choosing to upload his/her images to someone else's mobile device during the event.

It is contemplated that prior to the end of the event, the customer may be reminded or prompted to complete the synchronization of their orders. If the customer has orders, those orders may be synched or sent back to the event server if this task is not already done 98. The automated system would then save and process the order and provide the selected images to the user's computer or mobile device if the software application is resident on the computer or device 102. Alternatively, the customer may choose to sync or provide their order online following the conclusion of the event 106. If the customer has an existing account and software application loaded on their computer and/or mobile device, all that is required is for the customer to login access the images and place their order 110. If the customer does not have the software application loaded on their computer or mobile device, the customer will be prompted to download the application software online at the linked site to the system or other appropriate website. The customer will be prompted to login once the software application is downloaded and the customer is appropriately registered 114. The remaining functionality of the application described with respect to FIGS. 1 and 2 may then also be used with respect to the embodiment shown in FIG. 3.

As a further alternative, some embodiments of the present invention may employ a dynamic identification system that uses wireless technology wherein the customer actively notifies an event operator or photographer of their desire to order an image at about the time the image is taken and, perhaps, before the image is taken. This may be accomplished by sending a signal from the user's mobile device to the event server or other wireless receiver that the customer wishes to purchase an image. For example, in one embodiment, a customer would initiate a signal from his/her wireless communication device, such as by way of a previously loaded application, that would notify the event operator or photographer that the image obtained or to be obtained was desired for purchase. The customer could send this signal while waiting in line for the photographer, while posing for the image or following taking of the image. The contemplated signal could be generated by a software application loaded on a wireless communication device or it could be a standard text message sent to a specifically designated text number associated with a particular photographer or location. The signal sent from the mobile device may include one or more of time, location (using GPS, for example) and/or otherwise stamped such that the event operator or photographer could easily link the image to the customer or potential customer. The server could also be linked with the photographer's camera or video equipment to record time, location and other identifying information for purposes of associating images and customers. Alternatively, a display screen or monitor could be located nearby to allow the customer to view the image and then promptly place an order as described. Further still, the software application may generate a custom-specific alpha numeric code, or display a bar code, QR code or any other computer readable code, on the screen of the mobile device which is scanned by the photographer and associated with the image or images taken by the photographer. The user-specific images may then be sent directly to the user's mobile device or any other device identified by the user and maintained in the server database. In one embodiment, the technology is similar to the QR codes used by various airlines for their mobile boarding passes. It is contemplated that the customer or potential customer would have the ability to verify that an image was the image that they desired for purchase. Still other embodiments of the present invention allow for the customer or potential customer to expand the time window to allow them to view other images around the time that they requested their image.

If required, the customer may be instructed by the program to connect to a particular network or use a particular wireless technology when at the event to allow for connection to the event servers.

In another embodiment of the present invention a customer employs their mobile device similar to that described in FIG. 3 to capture images of which they may or may not be the subject. More specifically, the application of one embodiment includes functionality that allows individuals to indicate to an event server that they are interested in purchasing images associated with specific time and/or location. During a sporting event, for example, it may be desirable to possess a high quality professional image of a certain sub-event of the main event. As such, freelance photographers, or photographers employed by the event operators, may submit their photos to a generalized event server. When a particular sub-event occurs, whether anticipated such as a record breaking homerun or unanticipated such as an overtime score, the interested customer may access the application via their mobile device and indicate that an image of that sub-event is desired. The system would then identify the mobile customer, identify the time and/or location stamp associated with the sub-event and match that information with images submitted by one or more photographers in the event system. Those images would then be transmitted to the customer for review. It is contemplated that the application may provide to the customer images for a specified time frame before and after the actual sub-event such as plus or minus 5, 10, 15 minutes, etc. from when they indicated their interest in the image. This would allow the user to view a narrow sub-set of images as opposed to viewing all the photos associated with the event. Alternatively, an individual may request all of those photos submitted in an event for review and purchase.

The methods described herein can be a set of computer-executable instructions executed by a computer system or processor and/or encoded or stored on a computer readable medium. Computer-readable medium refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible, non-transitory storage medium and prior art-recognized equivalents and successor media, in which the software implementations of the present invention are stored.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A method of providing digital images to an event attendee, comprising:
   receiving an image purchase order including a payment from the attendee before an event though a website;
   taking at least one image of the attendee at the event;
   storing the at least one image and a software application configured to view the at least one image together on a physical media;
   fulfilling the order by providing the physical media to the attendee;
   in response to at least the providing, installing the software application onto an attendee-accessible computer;
   receiving a selection of at least one of:
      a subset of images from the at least one image, and
      an image-related product from the at least one image, wherein the selection is received after the event through the installed software application;
   creating a second image purchase order for at least one of:
      the subset of images, and the image-related product through the installed software application;

connecting the installed software application to the Internet;

in response to connecting the installed software application to the Internet, automatically submitting the second image purchase order by the installed software application;

delivering at least one of the subset of images and image-related product to at least one customer.

2. The method of claim 1, further comprising manipulating purchased images using the software application, wherein manipulating purchased images comprises at least one of copying, editing, and altering an image.

3. The method of claim 1, wherein the attendee-accessible computer comprises a desktop computer, a mobile communication device, a laptop, or a tablet computer.

4. The method of claim 1, wherein the physical media is a compact disc, a digital video disc, flash memory drive, or a memory card.

5. The method of claim 1, wherein the image-related product comprises a calendar, a mug, a photo book, clothing, a poster, a balloon, a postcard, a banner, and a puzzle.

6. The method of claim 1, further comprising receiving orders for the at least one image from the attendee at the event using a web-based system or kiosk.

7. The method of claim 1, further comprising taking at least one image of a plurality of attendees and linking the attendees to their images using one or more of facial recognition software, pattern recognition or other indexing technology.

8. The method of claim 1, further comprising using the software application off-line to preconfigure the image purchase order or to create the image-related product.

9. The method of claim 1, further comprising granting access to the at least one image to third parties.

10. The method of claim 9, wherein the third parties access the at least one image by downloading a copy of the software application onto their computer or by accessing the website.

11. The method of claim 9, further comprising providing the third parties with the ability to purchase the subset of images and the image-related product.

12. The method of claim 11, further comprising adding attendee-generated images to an event server.

13. The method of claim 1, further comprising: taking at least one image of the attendee at a second event; and, using the software application to access images of the attendee at the second event.

14. The method of claim 1, further comprising acquiring identification information, delivery information and/or billing information from the attendee.

15. The method of claim 14, further comprising saving the attendee information on an event server.

16. The method of claim 1, further comprising notifying the attendee via a mobile device of the attendee when a desired image is ready for purchase and forwarding the desired image to the mobile device of the attendee.

17. The method of claim 1, further comprising sending a signal to an event server from an attendee's mobile device, the signal comprising a time stamp and attendee identifying information.

* * * * *